(12) United States Patent
Pluszynski et al.

(10) Patent No.: US 7,604,113 B2
(45) Date of Patent: Oct. 20, 2009

(54) CHAIN WHEEL ARRANGEMENT

(75) Inventors: Andreas Pluszynski, Wuppertal (DE); Karl-Heinz Schurer, Herne (DE); Reinhold Bruggemann, Dortmund (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 11/208,994

(22) Filed: Aug. 22, 2005

(65) Prior Publication Data

US 2006/0037844 A1    Feb. 23, 2006

(30) Foreign Application Priority Data

Aug. 23, 2004    (DE)  .................. 20 2004 013 198 U

(51) Int. Cl.
*B65G 23/06* (2006.01)

(52) U.S. Cl. .................. 198/850; 198/834; 198/835; 474/95; 474/96

(58) Field of Classification Search .................. 198/834, 198/835, 850; 474/95, 96
See application file for complete search history.

(56) References Cited

U.S. PATENT DOCUMENTS

| | | | | |
|---|---|---|---|---|
| 3,213,703 A | * | 10/1965 | Fitzgerald | .................. 74/432 |
| 4,037,713 A | * | 7/1977 | Soliman et al. | .............. 198/725 |
| 4,049,112 A | * | 9/1977 | Tyslauk | ...................... 198/834 |
| 4,437,564 A | * | 3/1984 | Redder et al. | ............... 198/834 |
| 5,947,265 A | * | 9/1999 | Merten et al. | ............... 198/834 |

\* cited by examiner

*Primary Examiner*—Gene Crawford
*Assistant Examiner*—Kavel P Singh
(74) *Attorney, Agent, or Firm*—Cook Alex Ltd.

(57) ABSTRACT

A chain wheel arrangement for driving or reversing stations of underground scraper chain conveyors, comprising a chain wheel (1), a chain-wheel shaft (3) comprising a splined portion (11) between two offset-diameter shaft stub portions and to which the chain wheel (1) can be fastened in rotational engagement by axial sliding on to it, also comprising bearing shells (5) receiving bearings for the chain-wheel shaft (3), disposed on each side of the chain wheel (1) and adapted to be fastened in bearing-shell recesses, open at the edges, in the side cheeks of the driving or reversing station, also comprising bearing support rings (26) which abut the outer cage (4B) of the bearings (4), and securing means comprising spacer sleeves (16) for axially securing the chain wheel (1) relative to the splined portion (11), in which the spacer sleeves (16) rest loosely between the bearings (4A) and the chain wheel (1), wherein a clamping cover (30) is fastened to at least one shaft end (13) and presses against a clamping sleeve (29) which clamps a spacer ring (25) against the associated bearing (4).

12 Claims, 2 Drawing Sheets

CHAIN WHEEL ARRANGEMENT

Figure 1:
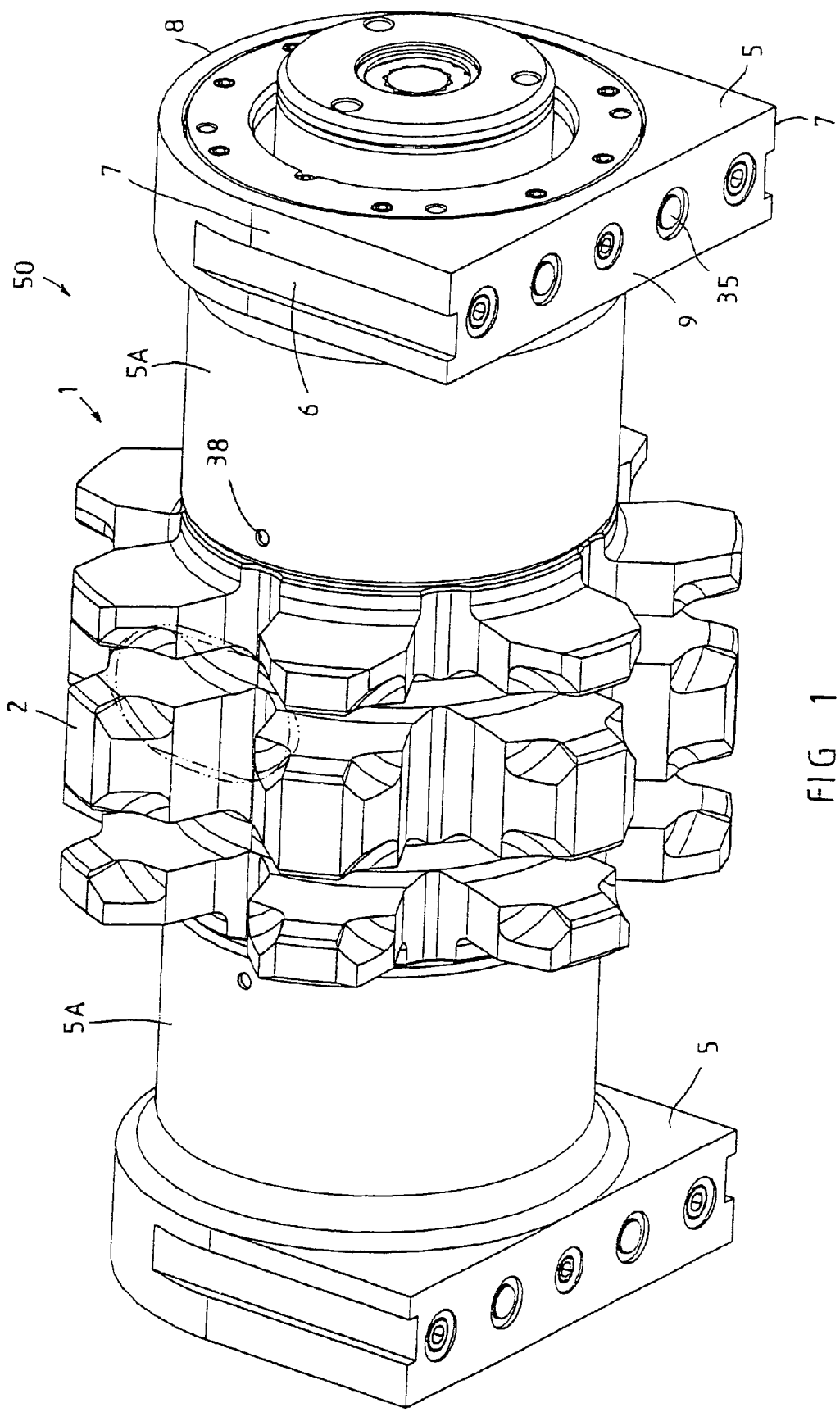

The present invention relates to a chain wheel arrangement for driving or reversing stations of underground scraper chain conveyors, comprising a chain wheel, a chain-wheel shaft comprising a splined portion between two offset-diameter shaft stub portions and to which the chain wheel can be fastened in rotational engagement by axial sliding on to it, also comprising bearing shells receiving bearings for the chain-wheel shaft, disposed on each side of the chain wheel and adapted to be fastened in bearing-shell recesses, open at the edges, in the side cheeks of the driving or reversing station, also comprising bearing support rings which abut the outer cage of the bearings, and securing means comprising spacer sleeves for axially securing the chain wheel relative to the splined portion.

In underground mining, use is made of scraper chain conveyors in the form of longwall conveyors, drift conveyors or transfer conveyors, in order to remove the rock or minerals, especially coal, won by an extracting unit and subsequently carry it away. Drift conveyors especially must have high conveying capacity, and scraper chain conveyors, including their drives, are subject to heavy wear. Drift conveyors have driving stations at both ends. Transfer conveyors frequently have only one driving station, in which case a reversing station with a non-driven chain wheel is provided at one end of the conveyor.

A chain wheel can be formed of a number of segments (DE 197 24 994 A1), which are coupled to the driving shaft by engagement via an adjusting spring and are locked to the driving shaft by annular collars which are slid over the flanks of the chain wheel. Owing to this multi-segment construction, the chain wheel can be dismantled without needing to remove the chain-wheel shaft from the machine frame.

DE 299 15 798 U1 discloses a chain wheel arrangement in accordance with the preamble, comprising a one-part chain wheel. The chain wheel is axially slid on to a splined portion of the chain-wheel shaft. The chain-wheel shaft is assembled or dismantled as a unit, starting from the head of the driving station, and to this end the side cheeks of the driving and/or reversing station are formed with bearing-shell recesses open at the edge, into which the bearing shells are inserted. In the chain-wheel arrangement in accordance with the preamble a spacer sleeve is screwed to both flanks of the one-part chain wheel and has a collar which abuts a peripheral shoulder on the chain-wheel shaft, so that the spacer sleeves provided on each side axially secure the chain wheel to the chain-wheel shaft. To this end the spacer sleeves and also the flanks of the one-part chain wheel are provided with a pattern of holes through which fastening screws extend. The pattern of holes increases the expense of producing the normally cast chain wheel. More especially the holes weaken the spacer sleeves and must be assembled by tightening numerous screws at a short distance from the peripheral surface of the chain-wheel shaft.

The aim of the invention is to construct a chain wheel arrangement which can likewise be fitted on the driving or reversing stations, starting from the front or head thereof, and is less complicated to pre-assemble.

Accordingly, the present invention is directed to a chain wheel arrangement as described in the opening paragraph of the present specification, wherein the spacer sleeves rest loosely between the bearings and the chain wheel, wherein a clamping cover is fastened to at least one shaft end and presses against a clamping sleeve which clamps a spacer ring against the associated bearing. At least one shaft end, therefore, the chain wheel is secured not by spacer sleeves firmly secured to the flanks of the chain wheel but by loose spacer sleeves which are fixed indirectly, relative to the chain-wheel shaft end, by a clamping sleeve and a clamping cover pressing against it. The chain wheel is thus positively secured by the dimensions of the clamping sleeve, the spacer ring, the bearing and the spacer sleeve relative to the free length of the shaft between the shaft end and the flank of the chain wheel. The individual parts of the chain wheel arrangement can be slid on to the shaft, starting from both ends, and the chain wheel can be positioned and axially fixed by fastening the clamping cover.

In a preferred embodiment the spacer sleeves comprise spacer tubes. The spacer tubes can have a uniform cross-section along their entire axial extent and are consequently easier and less expensive to make than the prior-art spacer sleeves, which have a contact collar and a pattern of holes.

Preferably also the clamping cover can be clamped and tightened against the clamping sleeve by a single screw disposed along the shaft axis. Consequently after the chain-wheel shaft and all securing means and bearing shells have been removed from the driving or reversing station, the chain wheel can be installed or dismantled by loosening only a single screw, in order to dismantle the bearing shells and take out the chain wheel.

Preferably when the chain wheel arrangement is in use on reversing stations, clamping covers and clamping sleeves are disposed on both shaft ends and the chain wheel is secured at both ends by identical securing means.

Advantageously, if the chain wheel arrangement is used on driving stations, a clamping cover and sleeve are used on only one shaft stub end, whereas the other end of the chain-wheel shaft is clamped by a part of the coupling interposed between the chain-wheel shaft and the driving motor and driving gear. In underground mining, especially good results in this connection have been achieved by arched couplings, since arched couplings can also compensate an axial offset between the drive or gear and the axis of rotation of the chain-wheel shaft. Of course, chain-wheel shafts for reversing stations are not driven and consequently do not need splines for attaching a coupling part or a motor.

The possible uses of a chain wheel arrangement in underground mining are especially wide-ranging if in a preferred embodiment, not one but both shaft ends end in splines, in which case it can be decided underground whether to attach the drive to the left or right or whether the chain wheel arrangement is used exclusively on reversing stations. The clamping sleeves in accordance with the invention can overlap the splined portion on the shaft ends, unless the drive is connected with rotational engagement to the said chain-wheel shaft end.

In an alternative embodiment, the bearing shells extend axially from the side cheeks up to the flanks of the chain wheel.

Preferably also, the bearing shells have an axial extension, the end face of which has a projection in the form of an annular web-like projection, wherein the flanks of the chain wheel have a peripheral groove into which the projection extends with clearance. The projection and groove can greatly reduce the entry and flow of small coal pieces to the bearing parts and the seals on the securing means for the chain wheel arrangement.

It is known that the spacer sleeves can partially extend under the flanks of the one-part chain wheel and axially project only partially over the flanks. In that case, sliding ring seals can be disposed on the outer periphery of the spacer sleeves in the region of the flanks, and are preferably also situated in the region protected by the projection and groove.

Advantageously the arrangement can be such that in each case one sliding ring seal is disposed in a groove or indentation, open at the edge, in the flank of the driving wheel and a second sliding ring seal is disposed in a groove or recess in the bearing shell or in the bearing-shell extension.

In another advantageous embodiment the bearing shells and extensions are provided with axial lubricating lines for lubricating the bearings.

Advantageously, connecting lines can open into the lubricating lines in the bearing shell extensions and are connected to lubricating nipples or lubricant supply bores in the end flanks or side flanks of the bearing shells. By this means, the bearings can be lubricated through the frame of the driving or reversing stations, especially through the side cheeks, as proposed for example in DE 100 50 698 A1 by the assignees.

Preferably, the bearing shells can have a convex end face and a flat end face, the flat end face being formed with the lubricating nipples or lubricant bores.

Preferably also, the two opposite side flanks of the bearing shells can be provided with guide grooves which co-operate with projections on the side cheeks, so that the bearing shells are positively secured to the side cheeks in the axial direction after the chain wheel arrangement has been assembled.

Figure 2:
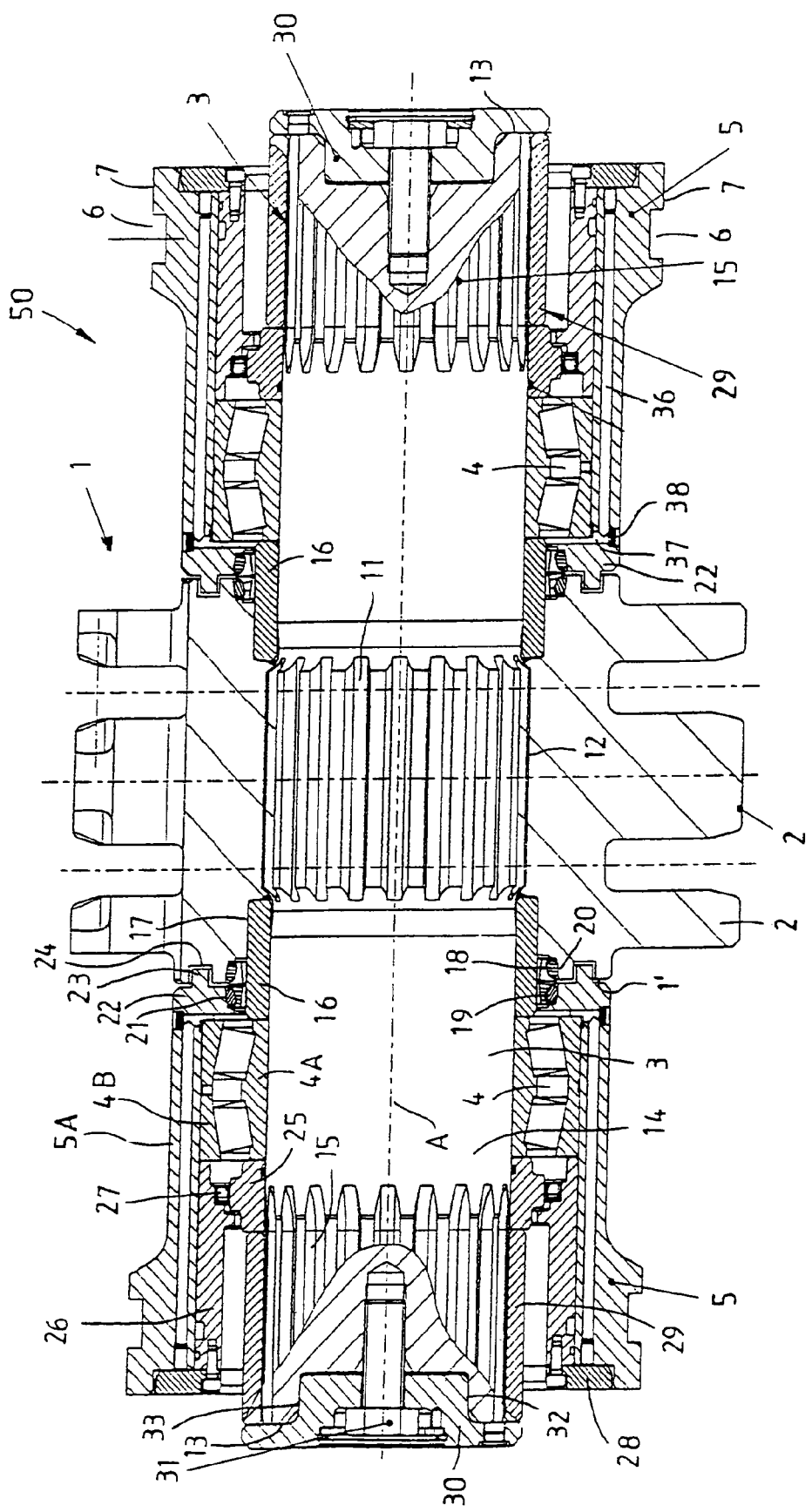

An example of a chain wheel arrangement made in accordance with the present invention is described herein below with reference to the accompanying drawings, in which:

FIG. 1 is a perspective view of a chain wheel arrangement in accordance with the present invention; and FIG. 2 is a longitudinal section through the chain wheel arrangement in FIG. 1.

The drawings show a chain wheel arrangement 50 comprising a one-part, especially cast, chain wheel 1, in the present case with three toothed rims 2 for guiding the horizontal and vertical links of a double central chain (not shown) of a scraper chain conveyor. The arrangement 50 also comprises a chain wheel shaft 3 horizontally disposed in the machine frame (not shown) of a driving or reversing station of the scraper chain conveyor, and bearings 4 disposed on each side of the chain wheel 1 and received in bearing shells 5 for rotatably supporting the chain-wheel shaft 3 on the side cheeks of the driving station or reversing station. The chain wheel arrangement 50 in kit form can be inserted in bearing-shell recesses at the head of the driving or reversing station (not shown), the recesses having a contour adapted to the shape of the bearing shells 5, shown especially clearly in FIG. 1. The side cheeks have horizontal projections which engage in the guide grooves 6 on the opposite side flanks 7 of the bearing shells 5 when the chain wheel arrangement 50 has been assembled. As FIG. 1 shows, the bearing shells 5 have a curved end surface 8 and a flat end surface 9, connecting the two side flanks 7 to one another.

Referring now to FIG. 2, the chain-wheel shaft 3 has a central splined portion 11 to which the one-part chain wheel 1 can be secured in rotational engagement by hub teeth 12 which match the toothed portion 11. A chain-wheel shaft 3 is offset in outer diameter on each side of the toothed portion 11, and both stub portions of the shaft 3, which are approximately unchanged in diameter up to the ends 13, are formed with an additional splined portion 15 near the ends 13 in the example embodiment shown. A bearing-shaft portion 14 on which the inner cages 4A of the bearings 4 can be fitted and supported is formed in each case between the outer splined portions 15 and the central splined portion 11 for the chain wheel 1.

The chain wheel 1 can be fitted on the shaft 3 by axial sliding from one end 13 of the shaft 3. In the assembly position the chain wheel 1 is secured to the shaft 3 with rotational engagement but is not axially fixed. In order axially to fix the chain wheel 1, tubular spacer sleeves 16 are slid on to the bearing-shaft portion 14 from both ends 13 of the shaft 3 so as to rest loosely on the side flanks of the chain wheel 1, and in the process are partially inserted into a stepped recess 17 on the inner periphery of the chain wheel 1 and partially extend under the chain wheel 1. Both spacer bushes 16 project partly over the flanks 1' of the chain wheel 1, and sliding-ring seals 18, 19 are disposed on the outer periphery of the spacer bushes 16. The sliding-ring seal 18 grips under a respective wedge shoulder 20 on the flanks 1' of the chain wheel 1, whereas the second sliding-ring seal 19 grips under a wedge shoulder 21 on a terminal portion 22 of an axial bearing extension 5A of the bearing shells 5. To protect the sliding-ring seals 18 and 19, the terminal portion 22 of the bearing-shell extension 5A is provided with an annular web-like projection 23 which engages in a peripheral groove 24 in the flanks 1' of the chain wheel 1. After the bearings 4 have been fitted together with the bearing shells 5, spacer rings 25 are axially slid on to the bearing-shaft portion 14 so that the rings 25 abut the inner cages 4A of the bearings 4. A bearing support ring 26 together with a seal 27 is then inserted into the bearing shells 5 so that the ring 26 presses against the outer cages 4B of the bearings 4 and a seal 27 is made between the support ring 26 and the spacer ring 25. The support ring 26 is secured by a closure ring 28 screwed on to the outer end of the bearing shell 5.

FIG. 2 shows a chain wheel arrangement 50 for a reversing station, in which neither shaft end is coupled to a drive with splines 15. Consequently a clamping sleeve 29 extends over the splined portion 15 at both shaft ends 13, one end of the sleeve 29 pressing against the spacer ring 25 whereas the other, axially outer end of the sleeve 29 can be tightened against the end 13 of the chain-wheel shaft 3 by a clamping cover 30 which is prestressed in the direction of the spacer ring 25 and consequently of the inner cages 4A of the bearings 4 by a clamping screw 31 situated along the axis A of rotation of the chain wheel shaft 3. For exact positioning of the clamping cover 30, the ends 13 can be formed with a concentric recess 32 in which a positioning collar 33 on the clamping cover 30 engages.

If the chain wheel arrangement 50 is not used on a driving station of a scraper chain conveyor, in contrast to the embodiment shown the clamping sleeve and the fastening thereof by the clamping cover 30 are omitted at one shaft end 13 and replaced by a coupling part, for example an arched coupling, which is slid on to the associated splined portion at the said shaft end. The coupling part will then have an extension which grips under the supporting ring 26 of the bearing shells and extends in the assembly direction as far as the spacer ring 25, where it axially fixes the chain wheel 1 in place of the omitted clamping sleeve.

As also shown in FIGS. 1 and 2, the bearing shells 5 have a lubricating device for the bearings 4. Lubricant is supplied to the bearing shells 5 through supply bores 35 in the flat end faces 9 of the bearing shells 5 and thence through connecting lines (not shown) into axial lubricating lines 36 in the bearing shell extension 5A up to the bearings 4. At the bearings 4, a radial tap line 37 is provided in the form of a bore which can be closed by a closure 38 on the outside of the bearing-shell extension 5A.

Lubricant for the bearings can then be supplied through the side cheeks of the frame (not shown) of the driving or reversing station.

The invention claimed is:

1. A chain wheel arrangement for driving or reversing stations of underground scraper chain conveyors, comprising a unitary chain wheel, a chain-wheel shaft comprising a splined portion between two offset-diameter shaft stub portions and to which the chain wheel can be fastened in rotational engagement by axial sliding on to said splined portion, also comprising bearing shells receiving bearings for the chain-wheel shaft, disposed on each side of the chain wheel and adapted to be fastened in bearing-shell recesses, open at the edges, in the side cheeks of the driving or reversing station, the bearing shells being formed with axial lubricating lines for lubricating the bearings, also comprising connecting lines that open into the lubricating lines and are connected to lubricating nipples or lubricant supply bores in end flanks or side flanks of the bearings shells, also comprising bearing support rings which abut the outer cage of the bearings, and securing means comprising spacer sleeves for axially securing the chain wheel relative to the splined portion, in which the spacer sleeves are axially movable between the bearings and the chain wheel, wherein a clamping cover is fastened to at least one shaft end and presses against a clamping sleeve which clamps a spacer ring against the associated bearing and moves said associated bearing axially against said spacer sleeve to move said spacer sleeve axially against said chain wheel.

2. A chain wheel arrangement according to claim 1, in which the spacer sleeves comprise spacer tubes.

3. A chain wheel arrangement according to claim 1, in which the clamping cover is adapted to be clamped against the clamping sleeve by a screw disposed along the shaft axis.

4. A chain-wheel arrangement according to claim 1, in which in a reversing station, clamping covers and clamping sleeves are disposed on both shaft ends.

5. A chain wheel arrangement according to claim 1, in which in a driving station, a clamping cover and sleeve are disposed on one shaft end whereas clamping is effected by a coupling part on the other shaft end.

6. A chain wheel arrangement according to claim 1, in which at least one or both shaft ends end in splines.

7. A chain wheel arrangement according to claim 1, in which the bearing shells extend axially from the side cheeks up to the flanks of the chain wheel.

8. A chain wheel arrangement according to claim 7, in which the bearing shells have an axial extension, the end face or end portion of which has a projection in the form of an annular web, and the flanks of the chain wheel have a peripheral groove into which the projection extends.

9. A chain wheel arrangement according to claim 1, in which sliding ring seals are disposed on the outer periphery of the spacer sleeve.

10. A chain wheel arrangement according to claim 9, in which in each ease one sliding-ring seal is disposed in a groove or indentation, open at the edge, in the flank of the chain wheel and a second sliding-ring seal is disposed in a groove or recess in the bearing shell.

11. A chain wheel arrangement for driving or reversing stations of underground scraper chain conveyors, comprising a unitary chain wheel, a chain-wheel shaft comprising a splined portion between two offset-diameter shaft stub portions and to which the chain wheel can be fastened in rotational engagement by axial sliding on to said splined portion, also comprising bearing shells receiving bearings for the chain-wheel shaft, disposed on each side of the chain wheel and adapted to be fastened in bearing-shell recesses, open at the edges, in the side checks of the driving or reversing station, the bearing shells being formed with axial lubricating lines for lubricating the bearings and a convex end face and a flat end face, wherein the flat end face is formed with lubricating nipples or lubricant supply bores, also comprising bearing support rings which abut the outer cage of the bearings, and securing means comprising spacer sleeves for axially securing the chain wheel relative to the splined portion, in which the spacer sleeves are axially movable between the bearings and the chain wheel, wherein a clamping cover is fastened to at least one shaft end and presses against a clamping sleeve which clamps a spacer ring against the associated bearing and moves said associated bearing axially against said spacer sleeve to move said spacer sleeve axially against said chain wheel.

12. A chain wheel arrangement according to claim 1, in which two opposite side flanks of the bearing shells have guide grooves which co-operate with projections on the side cheeks.

* * * * *